United States Patent
Hisanaga et al.

(10) Patent No.: US 11,533,537 B2
(45) Date of Patent: Dec. 20, 2022

(54) INFORMATION PROCESSING DEVICE AND INFORMATION PROCESSING SYSTEM

(71) Applicant: Sony Group Corporation, Tokyo (JP)

(72) Inventors: Kenji Hisanaga, Tokyo (JP); Kenji Ogawa, Tokyo (JP); Yoichi Kobori, Tokyo (JP); Taichi Shimoyashiki, Tokyo (JP); Nobuyuki Tanaka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/434,008

(22) PCT Filed: Feb. 20, 2020

(86) PCT No.: PCT/JP2020/006670
§ 371 (c)(1),
(2) Date: Aug. 26, 2021

(87) PCT Pub. No.: WO2020/184122
PCT Pub. Date: Sep. 17, 2020

(65) Prior Publication Data
US 2022/0159339 A1    May 19, 2022

(30) Foreign Application Priority Data
Mar. 11, 2019  (JP) ............................... JP2019-043787

(51) Int. Cl.
*H04N 21/442* (2011.01)
*H04N 21/422* (2011.01)
*H04N 21/45* (2011.01)

(52) U.S. Cl.
CPC . *H04N 21/44218* (2013.01); *H04N 21/42203* (2013.01); *H04N 21/4532* (2013.01)

(58) Field of Classification Search
None
See application file for complete search history.

(56) References Cited

U.S. PATENT DOCUMENTS 9,998,789 B1 *  6/2018  Kahn ............... H04N 21/44218
10,158,919 B1   12/2018  Merced
(Continued)

FOREIGN PATENT DOCUMENTS

JP    2004-178593 A    6/2004
JP    2010-537578 A    12/2010
(Continued)

OTHER PUBLICATIONS

International Search Report and Written Opinion dated May 26, 2020, received for PCT Application PCT/JP2020/006670, Filed on Feb. 20, 2020, 9 pages including English Translation.

*Primary Examiner* — Alexander Q Huerta
(74) *Attorney, Agent, or Firm* — Xsensus LLP (57) ABSTRACT

An information processing device according to the present disclosure includes: a reaction determiner that determines, on a basis of reaction information of a viewer who views a program, an attitude of the viewer toward the program; and an environment provider that provides the viewer with a viewing environment that is identical to a viewing environment provided to a viewer group having an attitude that is identical to the attitude of the viewer towards the program.

15 Claims, 7 Drawing Sheets

(56) References Cited

U.S. PATENT DOCUMENTS

| | | | |
|---|---|---|---|
| 10,496,358 B1* | 12/2019 | Hirst | H04S 7/30 |
| 2005/0289627 A1* | 12/2005 | Lohman | H04N 21/4316 |
| | | | 348/E7.071 |
| 2011/0214141 A1 | 9/2011 | Oyaizu | |
| 2011/0225515 A1* | 9/2011 | Goldman | G06Q 50/01 |
| | | | 715/753 |
| 2012/0185887 A1* | 7/2012 | Newell | H04N 5/77 |
| | | | 725/12 |
| 2012/0296972 A1* | 11/2012 | Backer | H04N 21/242 |
| | | | 709/204 |
| 2013/0046577 A1* | 2/2013 | Marci | A61B 5/16 |
| | | | 705/7.29 |
| 2013/0117771 A1* | 5/2013 | Lee | H04N 21/812 |
| | | | 725/10 |
| 2014/0366049 A1 | 12/2014 | Lehtiniemi | |
| 2015/0074698 A1* | 3/2015 | Pinto | H04N 21/6582 |
| | | | 725/14 |
| 2015/0113551 A1* | 4/2015 | Hicks | H04N 21/44218 |
| | | | 700/90 |
| 2016/0014435 A1* | 1/2016 | Cronin | H04N 21/2393 |
| | | | 725/82 |
| 2016/0353252 A1* | 12/2016 | Krasadakis | H04L 12/1845 |
| 2016/0366203 A1* | 12/2016 | Blong | H04N 21/44218 |
| 2017/0099519 A1* | 4/2017 | Dang | H04N 21/4223 |
| 2019/0379938 A1* | 12/2019 | Salo | H04N 21/8547 |
| 2020/0351321 A1* | 11/2020 | Lueth | H04N 21/234 |
| 2022/0038774 A1* | 2/2022 | Paz | H04N 21/6543 |

FOREIGN PATENT DOCUMENTS

| | | |
|---|---|---|
| JP | 2014-505280 A | 2/2014 |
| JP | 2014-143722 A | 8/2014 |
| JP | 2015-109505 A | 6/2015 |

* cited by examiner

FIG. 4

FIG. 7 ered and provide a viewing experience that is sufficiently
INFORMATION PROCESSING DEVICE AND INFORMATION PROCESSING SYSTEM

CROSS-REFERENCE TO RELATED APPLICATIONS

The present application is based on PCT filing PCT/JP2020/006670, filed Feb. 20, 2020, which claims priority to JP 2019-043787, filed Mar. 11, 2019, the entire contents of each are incorporated herein by reference.

TECHNICAL FIELD

The present disclosure relates to an information processing device and an information processing system that are suitable for viewing a TV (television) program or the like.

BACKGROUND ART

There is a technique for profiling a viewer using viewing habits and vocal tones of the viewer, regarding viewing of a TV program or the like (see PTL 1). There is also a technique for recommending a program to a viewer using a profile (or a preference) of the viewer and using information indicating a popularity of the program (see PTL 3). Further, there is a technique for acquiring effective information by voice recognition (see PTL 2).

CITATION LIST

Patent Literature

PTL 1: Japanese Unexamined Patent Application Publication No. 2014-143722
PTL 2: Japanese Unexamined Patent Application Publication No. 2004-178593
PTL 3: Japanese Unexamined Patent Application Publication (Published Japanese Translation of PCT Application) No. 2010-537578

SUMMARY OF THE INVENTION

With the above techniques, it is difficult to provide a viewing experience that is sufficiently highly satisfactory to a viewer.

It is desirable to provide an information processing device and an information processing system that are able to provide a viewing experience that is highly satisfactory to a viewer.

An information processing device according to an embodiment of the disclosure includes: a reaction determiner that determines, on a basis of reaction information of a viewer who views a program, an attitude of the viewer toward the program; and an environment provider that provides the viewer with a viewing environment that is identical to a viewing environment provided to a viewer group having an attitude that is identical to the attitude of the viewer towards the program.

An information processing system according to an embodiment of the disclosure includes a plurality of information processing devices each coupled to a network. Each of the plurality of information processing devices includes: a reaction determiner that determines, on a basis of reaction information of a viewer who views a program, an attitude of the viewer toward the program; and an environment provider that provides the viewer with a viewing environment that is identical to a viewing environment provided to a viewer group having an attitude that is identical to the attitude of the viewer towards the program.

The information processing device or the information processing system according to an embodiment of the disclosure provides the viewer with the viewing environment that is identical to the viewing environment provided to the viewer group having the attitude that is identical to the attitude of the viewer towards the program.

MODES FOR CARRYING OUT THE INVENTION

In the following, some embodiments of the present disclosure are described in detail with reference to the drawings. It is to be noted that description is given in the following order.
0. Comparative Example
1. First Embodiment (FIGS. 1 to 5)
 1.1 Configuration
 1.2 Operation
 1.3 Effects
2. Second Embodiment (Information Processing System Using P2P) (FIGS. 6 and 7)
3. Other Embodiments
<0. Comparative Example>
(Outline and Issue of Information Processing System According to Comparative Example)
There are: a technique for profiling a viewer using viewing habits and vocal tones of the viewer, regarding viewing of a TV program or the like; and a technique recommending a program to a viewer using a profile (or a preference) of the viewer and information indicating a popularity of the program.

However, in the above-described techniques, it is necessary that the viewer profile (or the preference) first be constructed beforehand. Even if the profile of the viewer is to be constructed by operation of the viewer himself/herself or is to be constructed automatically, viewing records of a similar program have to be tracked a plurality of times, and it is difficult to perform the construction unless they are predefined and repetitive. Although it is possible to determine the popularity of the program in advance by a statistical process such as a recording reservation, it is difficult to link the viewer to other viewers by associating the viewer with one attitude among a plurality of attitudes that the viewer may take during the program.

Accordingly, in the following embodiment, a description will be made of a technique for achieving a viewing experience with a sense of unity in an identical community (viewer group), by classifying attitudes toward a program by reactions of viewers who are viewing the program and by dynamically configuring a community of viewers having an identical attitude. This achieves a viewing experience that is highly satisfactory to the viewer.

<1. First Embodiment>

[1.1 Configuration]

(Overall Configuration Example of Information Processing System)

Figure 1:
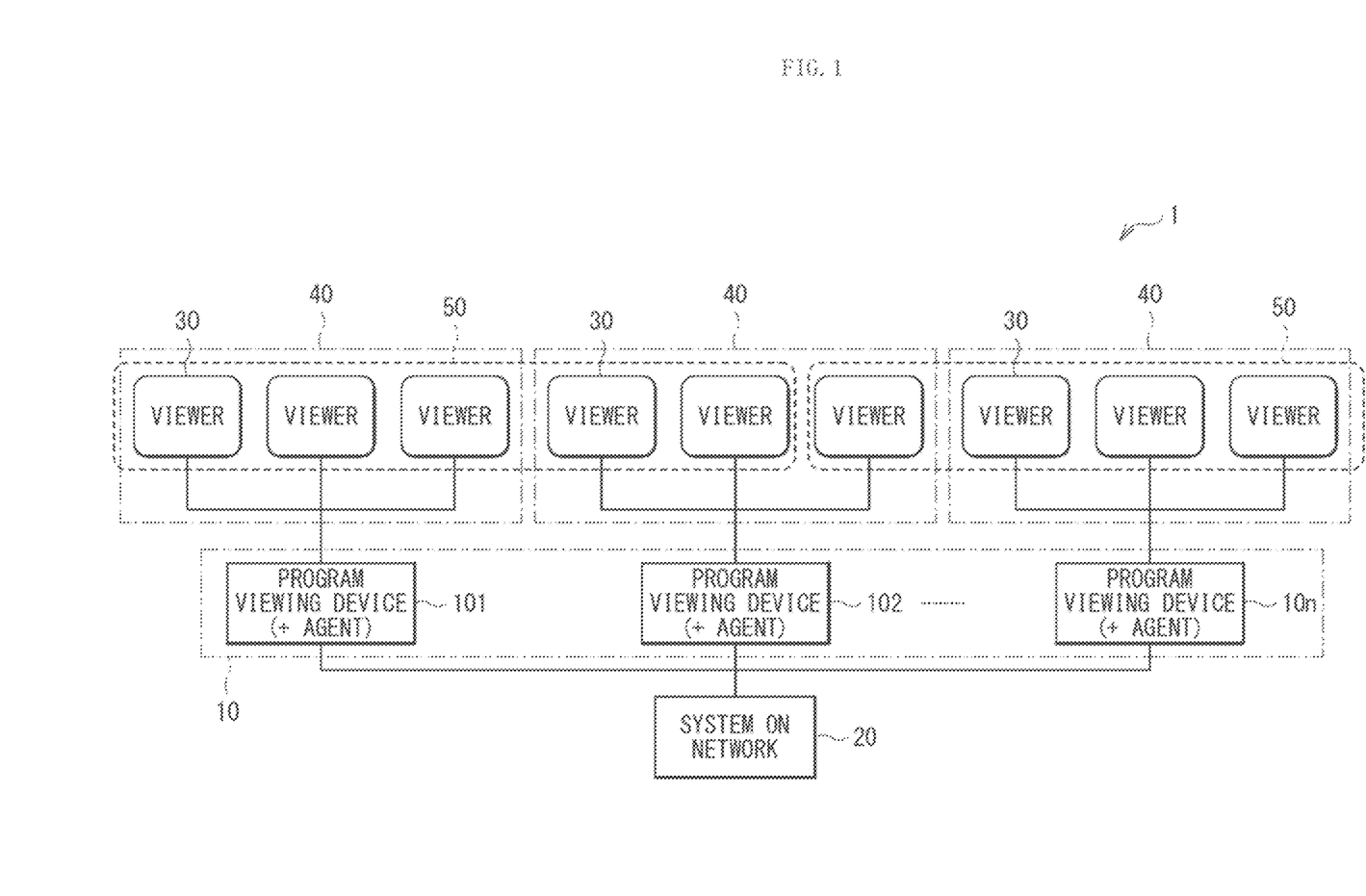
FIG. 1 is a block diagram illustrating an overall configuration example of an information processing system according to a first embodiment of the present disclosure.

FIG. 1 illustrates an overall configuration example of an information processing system 1 according to a first embodiment of the present disclosure.

The information processing system 1 includes: a plurality of program viewing devices 10 (101, 102, . . . 10n) coupled to a network; and a system 20 on the network that is network-connected to the plurality of program viewing devices 10.

The program viewing device 10 corresponds to a specific example of an "information processing device" according to a technique of the present disclosure. The system 20 on the network corresponds to a specific example of a "host server" according to a technique of the present disclosure.

The program viewing device 10 has: an agent function using an image and a voice, of mutually communicating with a viewer 30 by means of a voice, a video, and the like; and a network connection function. The program viewing device 10 includes, for example, a TV device. It is possible to achieve the agent function by, for example, a device that is built in the TV device. Further, some or all of the agent function may be achieved by a device externally attached to the TV device. For example, a function of a reaction collector 60 (FIG. 2) to be described later may be configured separately from a display 16 serving as the TV device. In this case, the program viewing device 10 may, for example, receive reaction information of the viewer from a completely separate agent (e.g., a smart speaker). Further, a configuration may be such that the agent function included in a device other than the TV device acquires the reaction information of the viewer and the TV device receives the acquired reaction information.

Here, in the first embodiment, the agent function refers to a function of providing some kind of services in response to a reaction such as a voice uttered by the viewer 30 who watches and listens to the program or a motion of the viewer 30. In particular, in the first embodiment, an example will be described in which an environmental sound corresponding to the reaction such as the voice uttered by the viewer 30 or the motion of the viewer 30 is provided as a service.

In the information processing system 1, one or a plurality of viewers 30 is viewing a program per program viewing device 10. A case in which the plurality of viewers 30 views a program per program viewing device 10 includes, for example, a form in which a group 40 such as a family views an identical program in a living room. The information processing system 1 includes a plurality of such program viewing devices 10 coupled to each other via a network, and classifies the viewers 30 into a plurality of communities 50. Each of the communities 50 includes a plurality of viewers 30 as surrounded by dotted frames. The community 50 is a viewer group having an identical attitude to the program.

On the program viewing device 10, a program in which a plurality of performers or a plurality of teams appear is viewable. In the information processing system 1, in a program such as a sports relay, an identical community 50 is formed by dynamically linking the viewers 30 that coincide with a cheering action during viewing with respect to participants (a team) in the program, in terms of the program-viewing action in which the viewers 30 support or have a supporting intention. In the information processing system 1, the plurality of viewers 30 is able to mutually share an identical viewing environment such as an identical support voice in the identical community 50.

In the information processing system 1, even in a situation where a family is watching a game by using a single program viewing device 10 (the plurality of viewers 30 for the single program viewing device 10), it is possible to perform an audio output with vocal tone changed for each viewer 30 with respect to each of the plurality of viewers 30 using the agent function, by performing the audio output using earphones. Further, the program viewing device 10 is also able to separate the audio output by personal identification using image recognition and beamforming. Such viewing by a plurality of persons is similar to viewing by a family, public viewing, viewing in a sports pub, or the like. Thus, in the information processing system 1, it is possible for single program viewing device 10 to individually collect reaction information of each of the plurality of viewers 30 and individually determine an attitude for the program of each of the plurality of viewers 30. Further, in the single program viewing device 10, it is possible to individually provide a viewing environment to each of the plurality of viewers 30.

(Configuration Example of Program Viewing Device 10)

Figure 2:
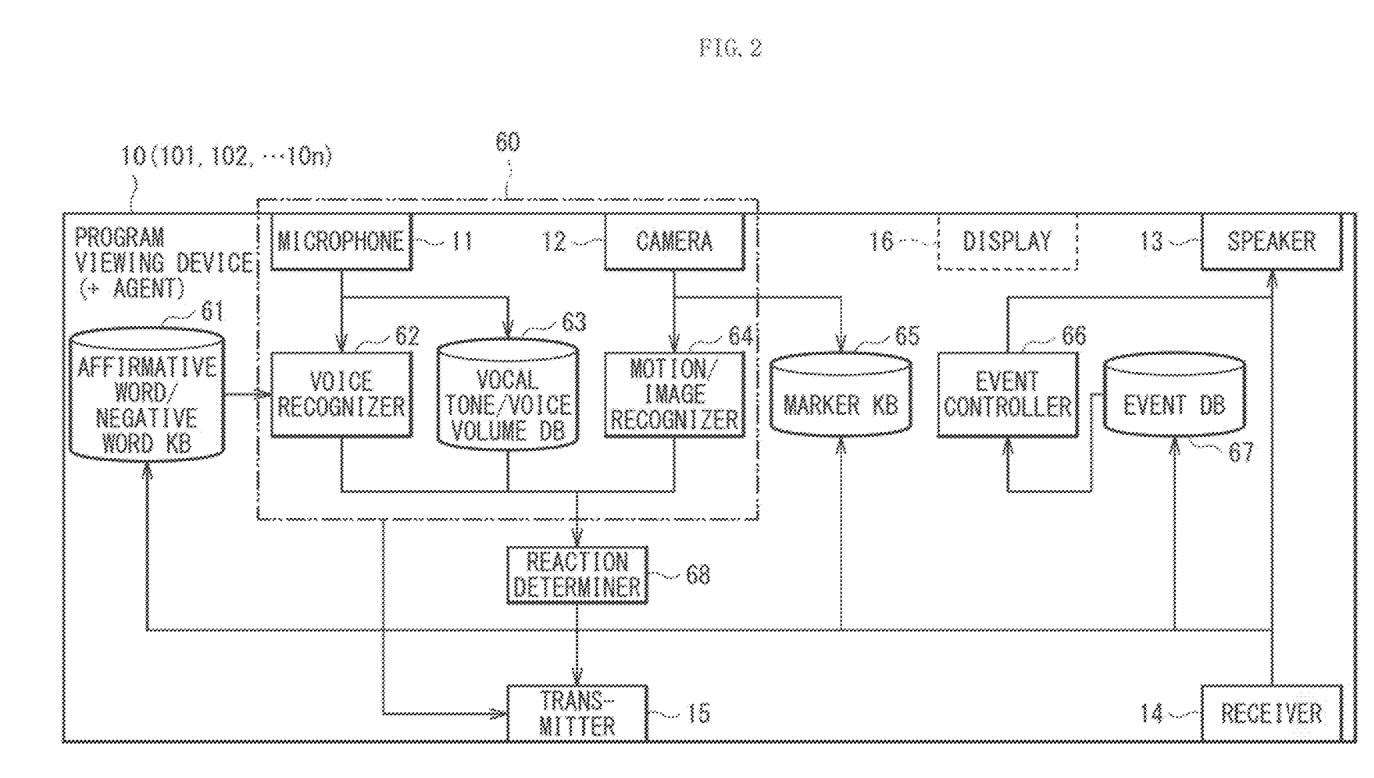
FIG. 2 is a block diagram schematically illustrating a configuration example of a program viewing device in the information processing system according to the first embodiment.

FIG. 2 schematically illustrates a configuration example of a program viewing device 10 in the information processing system 1.

The program viewing device 10 includes a microphone 11, a camera 12, a speaker 13, a receiver 14, a transmitter 15, and a display 16. The program viewing device 10 also includes an affirmative word/negative word KB (Knowledge Base) 61, a voice recognizer 62, a vocal tone/voice volume DB (database) 63, a motion/image recognizer 64, a marker KB 65, an event controller 66, an event DB 67, and a reaction determiner 68. The microphone 11, the camera 12, the voice recognizer 62, the vocal tone/voice volume DB 63, and the motion/image recognizer 64 configure the reaction collector 60.

The speaker 13 and the receiver 14 correspond to a specific example of an "environment provider" according to a technique of the present disclosure.

The microphone 11, the camera 12, and the speaker 13 are interfaces to the viewer 30 used for the agent function. The camera 12 is not limited to an ordinary RGB camera, and a thermography function may be added.

The transmitter 15 and the receiver 14 are each an interface to a network.

The display 16 displays a program. The display 16 may be a general TV device. In the program viewing device 10, the display 16 and some or all of an agent-function-providing parts may be configured separately. For example, as described above, the function of the reaction collector 60 may be configured as a separate unit.

The reaction collector 60 collects reaction information of the viewer 30 who views a program. The reaction information includes: a recognition result obtained by the voice recognizer 62; a recognition result obtained by the motion/image recognizer 64; and a vocal tone and a voice volume of the viewer 30 accumulated in the vocal tone/voice volume DB 63. The reaction collector 60 generates reaction time-series data for each viewer 30 on the basis of at least one of the recognition result obtained by the voice recognizer 62, the recognition result obtained by the motion/image recognizer 64, or the contents of the vocal tone/voice volume DB 63. Further, the reaction collector 60 also collects audio data of the viewer 30. Further, the reaction information includes, in a case where the viewer 30 views a program in which a plurality of performers or a plurality of teams appears, information indicating a cheering action performed by the viewer 30 to a specific performer or a specific team. In the reaction collector 60, for example, by performing personal recognition using image recognition or by separating audio input using a headset or beamforming, it is possible to individually collect respective pieces of reaction information of the plurality of viewers 30 by one program viewing device 10.

The affirmative word/negative word KB 61 retains voice recognition information for determining whether an utterance of the viewer 30 is affirmative or negative. The voice recognition information includes, for example: data indicating an utterance (e.g., "yes" or "no") which is generally determined to be affirmative or negative; and information (e.g., a team name) of an utterance that is determinable uniquely to a program being viewed. Affirmative word/negative word data including those pieces of voice recognition information is transmitted, as metadata, from the system 20 on the network together with distribution of the program, for example.

The marker KB 65 holds a marker video for determining an attitude from a video of the viewer 30. The marker video for determining the attitude of the viewer 30 includes, for example: a video showing a behavior (e.g., hand clapping, a posture of booing, or the like) which is generally regarded as affirmative/negative; and a video showing information (e.g., a uniform or a logo of a teams, or the like) that is specific to a program. The marker video is transmitted, as metadata, from the system 20 on the network together with the distribution of the program, for example.

The vocal tone/voice volume DB 63 accumulates vocal tones and voice volumes of the utterance of the viewer 30.

The voice recognizer 62 recognizes a reaction of the viewer 30 inputted from the microphone 11 using the affirmative word/negative word KB 61.

The motion/image recognizer 64 recognizes the reaction of the viewer 30 inputted from the camera 12 by using the marker KB 65. Contents to be recognized by the motion/image recognizer 64 include: an external appearance or a motion of the viewer 30, for example, contents of wearables of the viewer 30 (e.g., wearables of a team uniform, a presence or absence of a team logo, etc.); a behavior of the viewer 30 (e.g., hand gesture, hand clapping, the posture of booing, etc.); liveliness; a presence or absence of alcohol (e.g., a presence or absence of holding alcoholic beverages, etc.); a face color (e.g., a red face, etc.); and the like.

The reaction determiner 68 determines the attitude of the viewer 30 using at least one of the recognition result obtained by the voice recognizer 62, the recognition result obtained by the motion/image recognizer 64, or the vocal tones and the voice volumes accumulated in the vocal tone/voice volume DB 63. The reaction determiner 68 determines the attitude of the viewer 30 on the basis of, for example, a degree of deviation from a predetermined mean of the reaction of viewer 30. The reaction determiner 68 may determine the attitude of the viewer 30 on the basis of reaction time-series data generated on the basis of the reaction information.

The transmitter 15 transmits, to the system 20 on the network, the reaction time-series data for each viewer 30 generated by the reaction collector 60 and data of the attitude of the viewer 30 determined by the reaction determiner 68. Further, the transmitter 15 transmits the audio data collected by the reaction collector 60 to the system 20 on the network.

The receiver 14 receives data (e.g., data of an environmental sound) related to a viewing environment to be shared in the community 50 and causes the speaker 13 to playback the data. The community 50 is identical to the community 50 to which the system 20 on the network transmits a result of determining classification of the community 50. Further, the receiver 14 receives metadata transmitted from the system 20 on the network together with the distribution of the program.

The event DB 67 records an event that prompts the viewer 30 to act, and the event controller 66 causes an actual event to occur. For example, in a sports program, when introducing a team in a sports relay program, it is confirmed through the speaker 13 whether or not the team is being supported. Conditions of the event may include: an elapsed time from a start of the program; a start of viewing from a middle of the program; recognition of program contents such as CM detection; and the like. This event is distributed from the system 20 on the network as metadata related to the program, for example, as the information specific to the program. The event may be, for example, asking for a cheering action at a timing of introducing each team before a match in a sports program, for example. Examples of the cheering action include, clapping hands, hitting megaphones, swinging team flags, etc. Further, the cheering action may be an action of indicating a team to support by pressing a color button of a remote controller, operating a smartphone application, or the like.

(Configuration Example of System 20 on Network)

Figure 3:
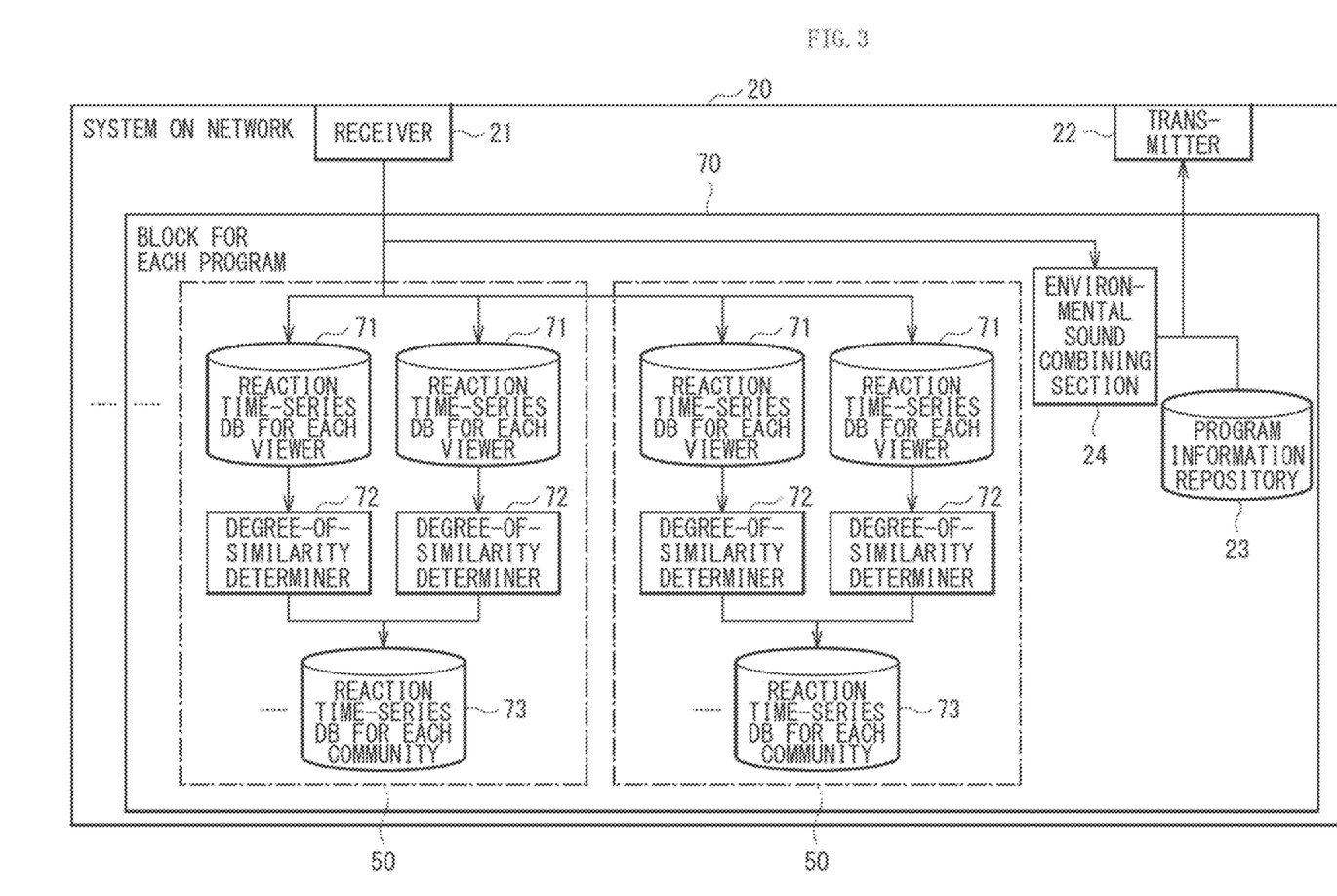
FIG. 3 is a block diagram schematically illustrating a configuration example of a system on a network in the information processing system according to the first embodiment.

FIG. 3 schematically illustrates a configuration example of the system 20 on the network in the information processing system 1. FIG. 3 is a configuration example for preparing a network service.

The system 20 on the network includes a receiver 21, a transmitter 22, a program information repository 23, and an environmental sound combining section 24. Further, the system 20 on the network includes a block 70 for each program.

The block 70 for each program includes a block for each community 50. The block for each community 50 includes a reaction time-series DB 71 for each viewer, a degree-of-similarity determiner 72, and a reaction time-series DB 73 for each community.

The receiver 21 receives data such as the reaction time-series data for each viewer 30 and the audio data transmitted from the individual program viewing devices 10.

The transmitter 22 transmits, to the individual program viewing devices 10, data related to the viewing environment (e.g., data of an environmental sound) and data such as metadata related to a program.

The program information repository 23 holds affirmative word/negative word data and a marker video specific to the program, and the affirmative word/negative word data and the marker video are transmitted, as the metadata related to the program, by the transmitter 22 to each program viewing device 10.

The metadata includes, for example, information for each program, such as the affirmative word/negative word data and the marker video, which are used in each program viewing device 10 to collect the reaction information of the viewer 30. The metadata also includes, for example, instruction data that indicates how the agent function actively makes an inquiry to the viewer 30 in each program viewing device 10. This instruction data includes data about an event that the event controller 66 of each program viewing device 10 causes to occur. The active inquiry to the viewer 30 includes, for example, asking the viewer 30 to perform an action such as clapping hands, hitting megaphones, or swinging team flags at a timing of introducing each team before a match in a sports program, for example. Further, the active inquiry to the viewer 30 may include prompting the viewer 30 to press a color button of a remote controller, prompting the viewer 30 to operate a smartphone application, prompting the viewer 30 to operate a device corresponding to the program, and the like. Further, it is also conceivable that the metadata includes information on how each program viewing device 10 performs recognition using voice recognition, image recognition, device communication, and the like, in response to the reaction of the viewer 30 prompted in this manner. For example, it is also conceivable to include, in the metadata, information such as a matching pattern of the reaction of the viewer 30.

The reaction time-series DB 71 for each viewer is a time-series DB that records the reaction time-series data for each viewer 30. The reaction time-series DB 73 for each community has a time-series DB that records reaction time-series data for each community 50. The degree-of-similarity determiner 72 determines (estimates by analogy) reaction time-series data of which community 50 is similar to each reaction time-series data for each viewer 30, and the each reaction time-series data for each viewer 30 is associated with the reaction time-series data of the relevant community 50. The reaction time-series DB 73 for each community retains the reaction time-series data for each community 50 that represents the thus associated reaction time-series data for each viewer 30.

The environmental sound combining section 24 combines voices of the viewers 30 belonging to the identical community 50 as the environmental sound, and transmits the environmental sound to each viewer 30 belonging to the community 50 by the transmitter 22. The environmental sound combining section 24 combines, for example, the voices of the viewers 30 classified into the identical community 50, and generates the environmental sound that sounds like a cheer. In this case, it is possible to use a stereophonic sound technology using multi-channel speech. Further, the environmental sound combining section 24 may combine by adding not only the voices of the actual viewers 30, but also a voice corresponding to the reaction information of the viewer 30. For example, the combining may be performed by adding a mechanical voice or applause that matches a cheering action.

The system 20 on the network matches different pieces of reaction information of the plurality of viewers 30 transmitted from the program viewing device 10 and classifies the pieces of reaction information into a community in which the viewers 30 showing a similar reaction are gathered. The voices of the viewers 30 classified into the identical community are combined by the environmental sound combining section 24 and the combined voice is transmitted back to the agent function of each viewer 30. Thus, in each program viewing device 10, the environmental sound like a cheer is played back and provided to each viewer 30 by the agent function. In this case, it is also possible to use a stereophonic sound technology using multi-channel speech. Accordingly, even in a case where a plurality of viewers 30 having different attitudes is present in one program viewing device 10, it is possible to individually provide an environmental sound to each of the plurality of viewers 30 having different attitudes.

[1.2 Operation]

Figure 4:
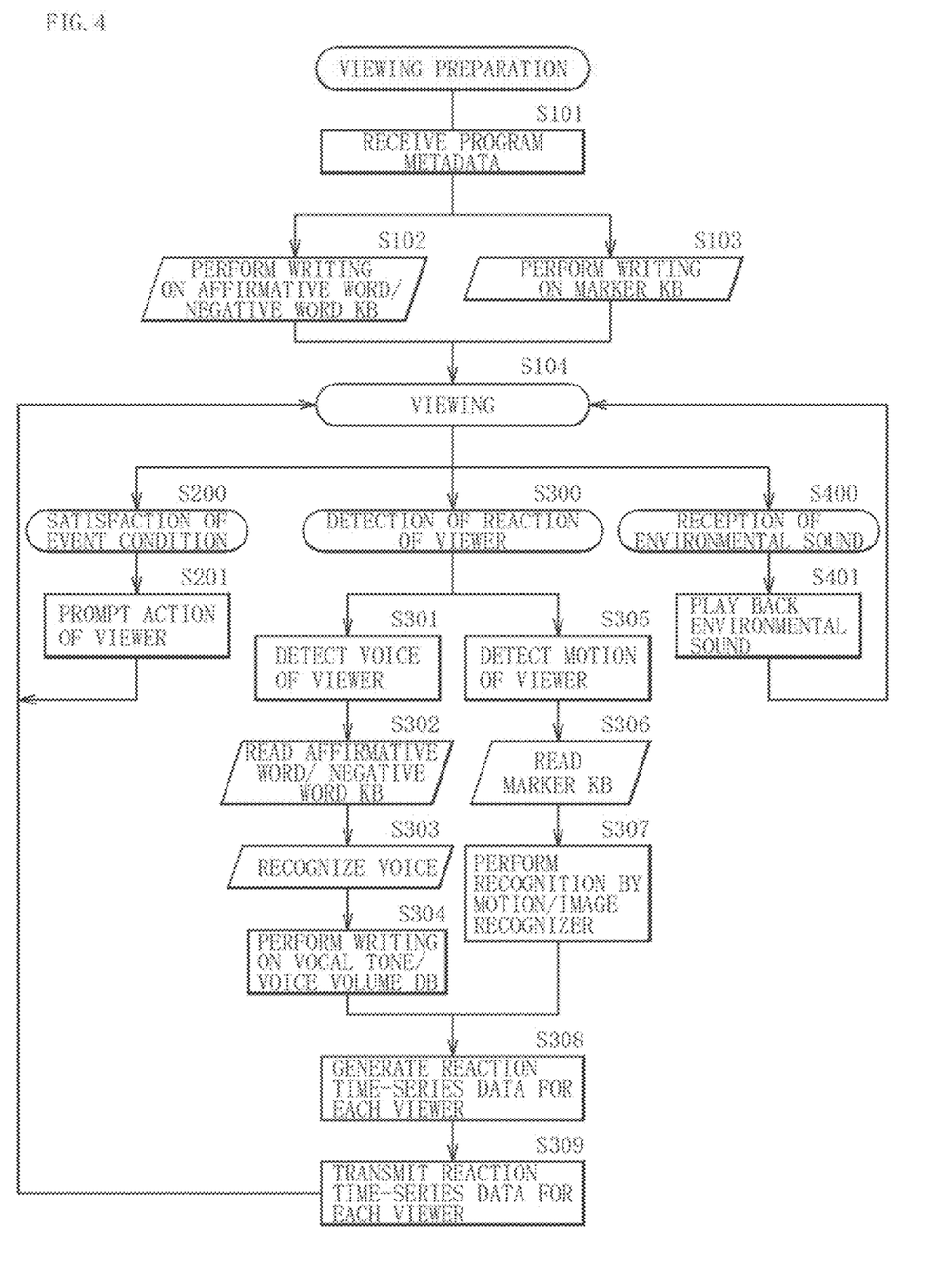
FIG. 4 is a flowchart schematically illustrating an example of operation of the program viewing device in the information processing system according to the first embodiment.

FIG. 4 is a flowchart schematically illustrating an example of operation of the program viewing device 10 in the information processing system 1.

First, the program viewing device 10 receives, by the receiver 14, metadata related to a program that is transmitted from the system 20 on the network (step S101). Although a timing of receiving the metadata may vary, here, as an example, it is assumed that the metadata is received prior to viewing the program.

Next, the program viewing device 10 writes affirmative word/negative word data included in the metadata on the affirmative word/negative word KB 61 (step S102). Further, the program viewing device 10 writes a marker video included in the metadata on the marker KB 65 (step S103).

During viewing (step S104), the program viewing device 10 causes an event to occur on an occasion of satisfying an event condition described in the event DB 67 (step S200), thereby prompting an action of the viewer 30 (step S201).

Further, the program viewing device 10 detects the reaction of the viewer 30 by the microphone 11 and the camera 12 during viewing (step S300). In a case where a voice of the viewer 30 is detected by the microphone 11 (step S301), the program viewing device 10 reads voice recognition information of the affirmative word/negative word KB 61 by the voice recognizer 62 (step S302) and recognizes the voice of the viewer 30 (step S302). In this case, the program viewing device 10 writes information of a vocal tone and a voice volume on the vocal tone/voice volume DB 63 and updates the vocal tone/voice volume DB 63 (step S304). Further, in a case where a motion of the viewer 30 is detected by the camera 12 (step S305), the program viewing device 10 reads a marker video of the marker KB 65 (step S306) and recognizes an external appearance, a motion, and the like of the viewer 30 (step S307) by the motion/image recognizer 64. The reaction collector 60 generates reaction time-series data for each viewer 30 on the basis of at least one of the recognition result obtained by the voice recognizer 62, the recognition result obtained by the motion/image recognizer 64, or the contents of the vocal tone/voice volume DB 63 (step S308). The transmitter 15 transmits the reaction time-series data for each viewer 30 to the system 20 on the network (step S309).

Further, in a case where an environmental sound of the community 50 to which the viewer 30 belongs, which is transmitted from the system 20 on the network, is received during viewing by the receiver 14 (step S400), the program viewing device 10 plays back the environmental sound from the speaker 13 (step S401).

(Specific Example of Reaction Time-Series Data)

Figure 5:
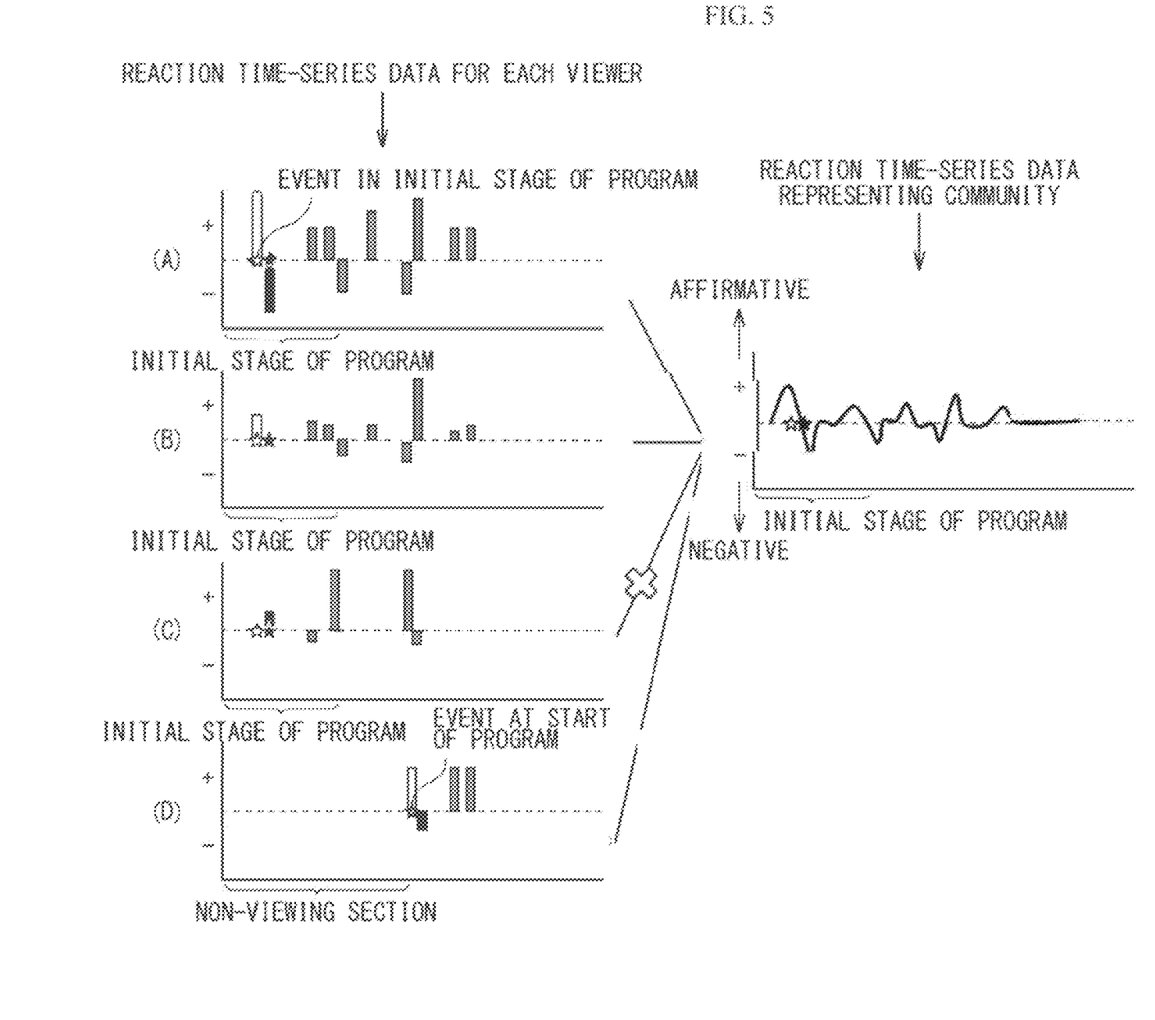
FIG. 5 is an explanatory diagram illustrating an example of reaction time-series data generated in the information processing system according to the first embodiment.

FIG. 5 illustrates an example of reaction time-series data generated in the information processing system 1. FIG. 5 illustrates how the community 50 is classified by summarizing reaction time-series data for each viewer 30, which is performed by the system 20 on the network.

For example, in a sports program such as a sports relay in which two teams, black and white, compete, both teams are introduced in an initial stage of the program, and reaction time-series data is an intensity of an affirmative/negative reaction using a voice. In FIG. 5, an example of the respective pieces of reaction time-series data for viewers (A), (B), (C), and (D) is illustrated on the left side. The affirmative reaction is indicated by a bar on a+side and the negative reaction is indicated by a bar on a−side, and lengths of the bars each correspond to an intensity of the affirmative reaction or the negative reaction.

In FIG. 5, a color of the bar represents a supporting team which has been distinguished, and a gray bar represents one that is not clear. In the initial stage of the program, by providing an event that an agent makes an inquiry to the viewers 30 during a team introduction, reactions are obtained that reveal which of the black team and white team the viewers 30 stand for. Thereafter, the recognition is performed without prior information, and the color is gray.

The viewers (A) and (B) exhibit similar affirmative/negative reactions at similar timings, although differs in intensities, it is possible to determine that the viewers (A) and (B) belong to the same community 50. In contrast, the viewer (C) exhibits different reactions, and it is possible to determine that the viewer (C) belongs to a different community 50.

The system 20 on the network generates reaction time-series data that represents the community 50 on the right side of FIG. 5, on the basis of the pieces of reaction time-series data of the viewers 30 determined to be in the same community 50. Typically, a graph is conceivable in which averages of the intensities are indicated and the averages are interpolated. If the calculation method in which individual pieces of data are added sequentially is adopted in this manner, it is easy to make a configuration in a P2P network of a second embodiment (FIG. 6), which will be described later. The classification into the community 50 is performed in accordance with the graph on the right side of FIG. 5 and a degree of similarity of the reaction time-series data for each viewer 30. There is no reaction time-series data that represents the community 50 at a start point of the program. Accordingly, it is possible to perform initial classification by causing an event to occur in the initial stage of the program to prompt the viewers 30 to take reactions to establish the black attitude or the white attitude. Thereafter, it is possible to increase accuracy in accordance with accumulation of data. A timing at which such a promotion of the reactions of the viewers by the event is performed is not limited to the initial stage of the program, and may also be performed in the middle of the program, as an inquiry during a calm period. The system 20 on the network re-evaluates the degree of similarity with another community 50, because the classification of the community 50 is not clear while the degree of similarity between the reaction time-series data of the community 50 and the reaction time-series data for each viewer 30 is low. The reaction time-series graph of the community 50 on the right side of FIG. 5 is updated in accordance with the accumulation of data; however, it is possible to have hysteresis to avoid a frequent change in the community 50 classification by this accumulation.

The viewer (D) is a viewer who has started viewing the program from the middle. For example, in a case of the sports relay, it is possible to make the attitude of the viewer clear by indicating the present progress at the time of starting viewing. As a result, it is possible to classify the viewer who has started viewing from the middle into the community 50 at an early stage. This example is the graph of the intensities of the affirmative/negative reactions using voices; however, it is conceivable that the voice volume is evaluated separately, and that not only the voice but also a gesture and a facial color are evaluated. Use of such multi-dimensional information makes it possible to perform more detailed classification of the community 50, such as classification based on quietness of the viewer, classification for enjoying viewing regardless of teams, and classification based on the presence or absence of alcohol.

MODIFICATION EXAMPLES

In the above description, the viewing of the sports program has been mainly described; however, the technique according to the first embodiment is also applicable to viewing of a program in other genres. For example, in a music program, a community 50 may be formed in accordance with a preference of the viewer 30 regarding a music genre, a performer such as a singer who appears in the music program, and the like. Further, in an election program, for example, a community 50 may be formed in accordance with a preference of the viewer 30 regarding a performer such as a candidate or the like.

In the above description, the case has been described as an example that the environmental sound is changed for each community 50 as the viewing environment; however, the present disclosure is not limited thereto. Not only the sound but also a video of the program may be changed partially or entirely for each community 50. For example, for each community 50, a video may be provided in which an angle of a camera is changed, for example, the angle is changed to an angle close to a supporting team. Further, for example, information of the supporting team may be displayed in a part of the video of the program.

[1.3 Effects]

As described above, according to the information processing system 1 of the first embodiment, the viewer 30 is provided with the viewing environment that is identical to the viewing environment provided to the viewer group (the community 50) having the attitude that is identical to the attitude of the viewer 30 towards the program. This makes it possible to achieve a viewing experience that is highly satisfactory to the viewer 30.

According to the information processing system 1 of the first embodiment, the viewer 30 is able to experience viewing corresponding to performing cheering action in the community 50 in which a support/support intention coincide with each other in a rooter's seat of a stadium or in public viewing, while staying in a private viewing space, without detecting or setting in advance a user attribute such as a preference. The construction of the community 50 is not only predefined according to contents of the program, such as "team A supporters" and "team B supporters", but also allows for spontaneously arising dynamic grouping based on reactions of the actual viewers 30, such as a community 50 in which viewers watch silently, without being biased toward the support of a particular team.

Further, in the program viewing device 10, upon detecting the reaction of the viewer 30 by the agent function, it becomes possible to perform classification of the community which is more comfortable for the viewer 30, by recognizing not only a sentence obtained by recognizing a voice, but also the change in the vocal tone or the voice volume, the face color in the video, the presence or absence of alcohol, the liveliness, or the like. The classification of the community which is more comfortable for the viewer 30 includes classification into a community 50 of the viewers 30 who prefers quiet cheering, or classification into a community 50 based on the presence or absence of alcohol.

Also, even in the case where the single program viewing device 10 having the agent function is viewed by the plurality of viewers 30, it is possible to classify the viewers 30 into different communities 50 for each viewer 30 by causing the individual user to use an earphone, a headset, or the like.

Still further, the preparation of the metadata for smoothly operating the system by associating the metadata with the program contents that are known in advance to some extent makes it possible for the agent function to make an inquiry specialized in the program contents to the viewer 30 and determine the reaction. This allows accurate, detailed, and rapid classification of the community 50. In addition, a further useful reaction for the classification of the community 50 is easily obtainable by causing the event in which the viewer 30 participates to occur.

Moreover, a voice of a certain viewer 30 shared between the viewers 30 through the network is combined with the voices of other viewers 30 who are classified in the same community 50, and is buried as a voice in the environmental sound and the crowd of people, which is one of privacy considerations. Further, at this time, combination into multiple channels is able to make an environmental sound such that audience of a stadium utters from spectators' seats of the stadium toward the field together with the surrounding viewers 30 in a case where a sport is relayed in a sports program, depending on a surround reproduction environment of viewer 30, for example, and it is possible to bring the viewing experience close to watching of the game in the stadium. Further, when combining the environmental sound of the entire community 50, not only the voices of the viewers 30 actually present but also combined voices by a machine are mixed to amplify the excitement, whereby it is possible to achieve a higher viewing experience even in situations where there are few participants, such as in the initial stage of forming the community 50.

It should be noted that the effects described herein are merely illustrative and not limitative, and other effects may be achieved. The same applies to effects of other embodiments described below.

<2. Second Embodiment>

Next, an information processing device and an information processing system according to a second embodiment of the present disclosure will be described. In the following description, the same reference numerals are given to substantially the same components as those of the information processing device and the information processing system according to the first embodiment described above, and description thereof will be omitted as appropriate.

Figure 6:
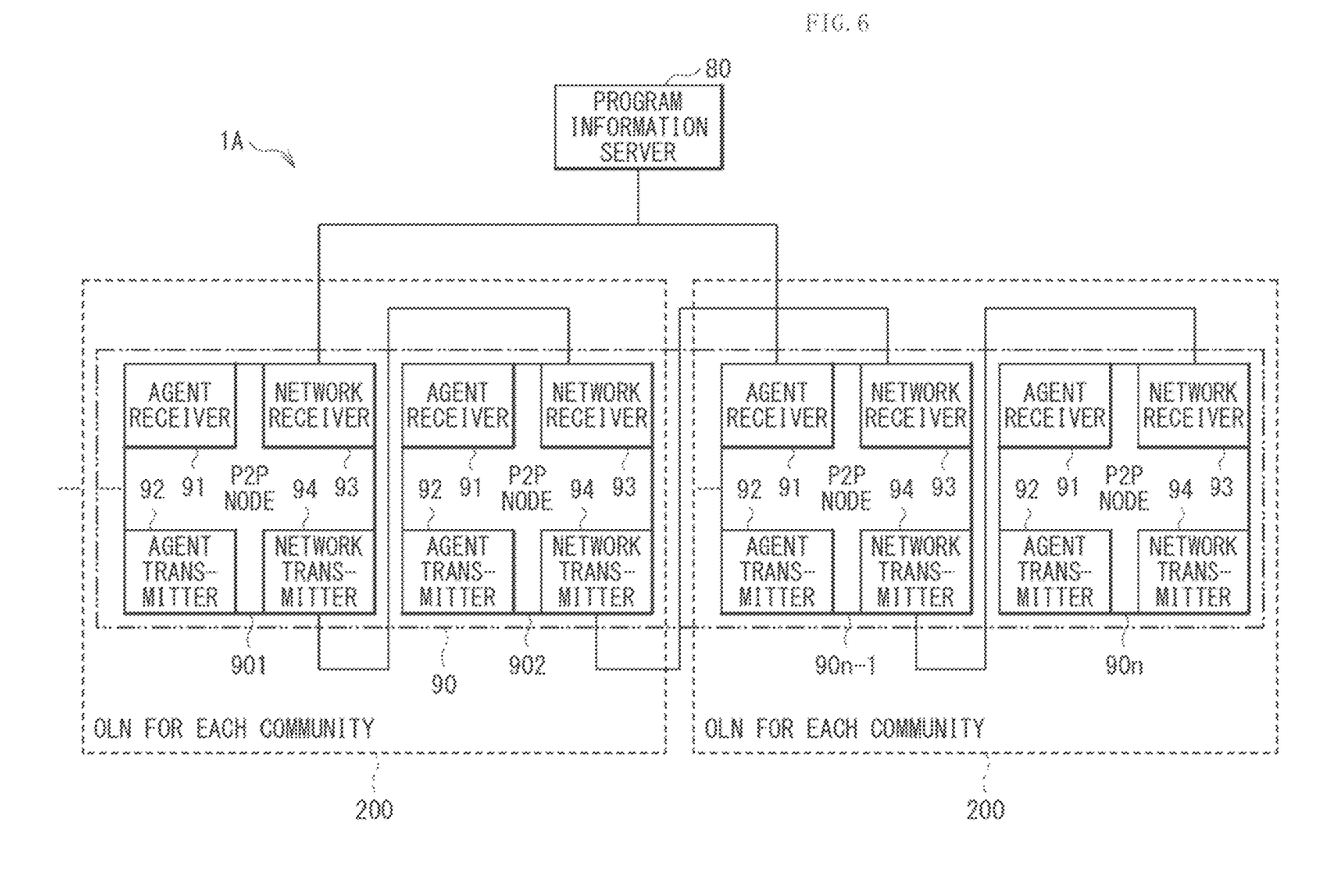
FIG. 6 is a block diagram illustrating an outline of an information processing system according to a second embodiment.

FIG. 6 illustrates an outline of an information processing system 1A according to the second embodiment. FIG. 6 illustrates an example in which a portion of a function of the system 20 on the network in the information processing system 1 according to the first embodiment is configured by P2P.

The information processing system 1A includes a plurality of P2P nodes 90 (901, 902, . . . 90n-1, and 90n) and a program information server 80.

The program information server 80 corresponds to a specific example of a "host server" according to a technique of the present disclosure.

The P2P node 90 is achievable by a device that is built in, or a device externally attached to, the program viewing device 10 included in the information processing system 1 according to the first embodiment.

P2P is a method in which end nodes communicate directly with each other, and configures a network without having a centralized server (or with small responsibilities and loads) compared to a server-client method. In the example illustrated in FIG. 6, assuming that the place where the P2P node 90 is actually disposed is the program viewing device 10 having the agent function, a transmitter/receiver (an agent transmitter 92 and an agent receiver 91) for the agent is configured separately from a transmitter/receiver (a network transmitter 94 and a network receiver 93) for the network; however, it is also possible that the node function portion of the P2P node 90 may be disposed separately on the network.

Figure 7:
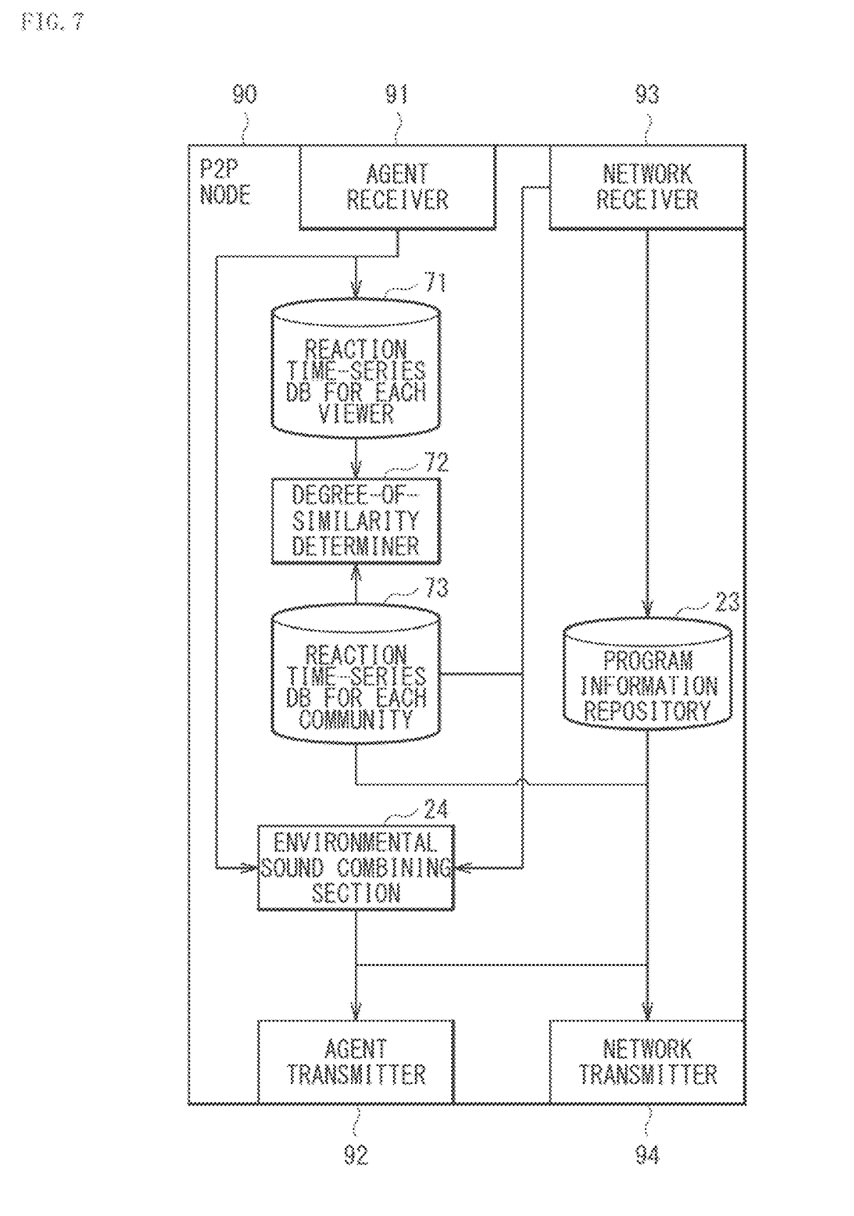
FIG. 7 is a block diagram schematically illustrating a configuration example of a P2P node in the information processing system according to the second embodiment.

FIG. 7 schematically illustrates a configuration example of the P2P node 90 in the information processing system 1A.

The P2P node 90 includes the program information repository 23, the environmental sound combining section 24, the reaction time-series DB 71 for each viewer, the degree-of-similarity determiner 72, and the reaction time-series DB 73 for each community.

The function of each configuration block in the P2P nodes 90 is similar to the function of each configuration block in the system 20 on the network in the information processing system 1 according to the first embodiment. However, the blocks of the reaction time-series DB 73 for each community and the program information repository 23 are synchronized between the P2P nodes 90. A network of terminals communicating with P2P is called an overlay network (OLN). In the example of FIG. 6, the OLN is provided for each community 50 (OLN 200 for each community), which means that participating in the OLN corresponds to being classified into a community 50 (groups each surrounded by a broken line in FIG. 6). The OLN that lies across in a perpendicular direction is also constructed. This allows pieces of data that lie across the communities 50 to be synchronized and the P2P node 90 to be re-distributed into a more matching community 50 (the middle in FIG. 6, a network connection between two P2P nodes 90 in different OLNs 200 for each community). Alternatively, in a case where the degree of similarity to the community 50 is low, the P2P node 90 may attempt to join each OLN 200 for each community. This corresponds to attempting to join another OLN 200 for each community in the P2P network. The method of joining the OLN 200 for each community and synchronization of data between P2P nodes 90 are applied from various P2P algorithms as appropriate. It is to be noted that, although latency due to propagation of information between nodes is assumed in the P2P network, exact matching is not necessary in the technique of the present disclosure, and it is not necessary to wait for all pieces of information to be collected with an emphasis on latency.

Information common to all P2P nodes 90 such as program information (metadata) is distributed from the top-stream program information server 80. The P2P network does not generally have a large central server, but has a small server or a node that is responsible for index information of the node. FIG. 6 illustrates an example in which the program information server 80, as a top-stream server, distributes information to some of the P2P nodes 90 and distributes the program information to all through the P2P network. In this case, each P2P node 90 is able to receive program information before the classification of the community 50 by preparing the OLN to participate before being classified into the community 50. In addition, a configuration is also conceivable in which distribution is performed from the server to all P2P nodes 90.

Other configurations, workings and effects may be substantially similar to those of the information processing device and the information processing system 1 according to the first embodiment described above.

<3. Other Embodiments>

The technique according to the present disclosure is not limited to the above embodiments and the like, and may be modified in a variety of ways.

For example, the present technology may have the following configurations.

According to the present technology of the following configurations, the viewer is provided with the viewing environment that is identical to the viewing environment provided to the viewer group having the attitude that is identical to the attitude of the viewer towards the program. This makes it possible to achieve a viewing experience that is highly satisfactory to the viewer.

(1)

An information processing device including:

a reaction determiner that determines, on a basis of reaction information of a viewer who views a program, an attitude of the viewer toward the program;

a reaction determiner that determines, on a basis of the reaction information of the viewer collected by the reaction collector, the attitude of the viewer toward the program; and an environment provider that provides the viewer with a viewing environment that is identical to a viewing environment provided to a viewer group having an attitude that is identical to the attitude of the viewer towards the program.

(2)

The information processing device according to (1), in which the viewing environment includes an environmental sound.

(3)

The information processing device according to (1) or (2), in which the program is a program in which a plurality of performers or a plurality of teams appears, and the reaction information of the viewer includes information indicating a cheering action toward a specific performer out of the plurality of performers or a specific team out of the plurality of teams.

(4)

The information processing device according to any one of (1) to (3), in which the reaction information of the viewer includes at least one of a voice uttered by the viewer, an external appearance of the viewer, or a motion of the viewer.

(5)

The information processing device according to any one of (1) to (4), in which the reaction information is individually collected for each of a plurality of the viewers, the reaction determiner individually determines an attitude of each of the plurality of viewers toward the program, and the environment provider individually provides a viewing environment to each of the plurality of viewers.

(6)

The information processing device according to any one of (1) to (5), further including a reaction collector that collects the reaction information of the viewer who views the program.

(7)

The information processing device according to (6), further including a transmitter that transmits data to a host server, the host server being network-connected to a plurality of the information processing devices, in which the reaction collector generates reaction time-series data that indicates a temporal change of a reaction of the viewer who views the program, and the transmitter transmits the reaction time-series data for each viewer generated by the reaction collector.

(8)

The information processing device according to (7), in which, in the host server, the viewer group having the identical attitude is estimated by analogy on a basis of the reaction time-series data for each of a plurality of the viewers obtained from the plurality of information processing devices, and data related to the identical viewing environment is transmitted from the host server.

(9)

The information processing device according to (8), in which the data related to the identical viewing environment includes data of an environmental sound, the environmental sound being generated by combining voices of the viewer group having the identical attitude.

(10)

The information processing device according to (9), in which the environmental sound includes the voices of the viewer group having the identical attitude and a voice that is added in accordance with the reaction information of the viewer.

(11)

The information processing device according to any one of (1) to (10), further including a receiver that receives metadata related to the program to be used for collecting the reaction information of the viewer from a host server that is network-connected.

(12)

The information processing device according to (11), in which the metadata includes instruction data that issues an instruction to cause an event of prompting the viewer to react toward the program to occur.

(13)

The information processing device according to (12), further including an event controller that causes an event of prompting the viewer to react toward the program to occur on a basis of the metadata.

(14)

An information processing system including a plurality of information processing devices each coupled to a network, each of the plurality of information processing devices includes a reaction determiner that determines, on a basis of reaction information of a viewer who views a program, an attitude of the viewer toward the program, and an environment provider that provides the viewer with a viewing environment that is identical to a viewing environment provided to a viewer group having an attitude that is identical to the attitude of the viewer towards the program.

(15)

The information processing system according to (14), further including a host server that is coupled to the network, and transmits, to each of the information processing devices, metadata related to the program to be used for collecting the reaction information of the viewer.

(16)

The information processing system according to (15), in which each of the information processing devices further includes a reaction collector that collects the reaction information of the viewer who views the program, the reaction collector generates reaction time-series data that indicates a temporal change of a reaction of the viewer who views the program, and the host server estimates by analogy the viewer group having the identical attitude on a basis of the reaction time-series data for each of a plurality of the viewers obtained from the plurality of information processing devices.

(17)

The information processing system according to (14) or (15), in which the plurality of information processing devices is coupled to each other via a P2P network.

This application claims the benefit of Japanese Priority Patent Application JP2019-43787 filed with the Japan Patent Office on Mar. 11, 2019, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An information processing device comprising:
circuitry configured to
determine, on a basis of reaction information of a first viewer who views a program, an attitude of the first viewer toward the program;
provide the first viewer with a first viewing environment that is identical to a viewing environment provided to a viewer group having an attitude that is identical to the attitude of the first viewer towards the program:
collect the reaction information of the first viewer and generate reaction time-series data that indicates a temporal change of a reaction of the first viewer who views the program;
a transmitter that transmits the reaction time-series data for each viewer to a host server, the host server being network-connected to the information processing device and a plurality of other information processing devices that generate reaction time-series data that indicates a temporal change of a reaction of each of a plurality of viewers who view the program, the host server receiving the reaction time-series data generated by the plurality of the information processing devices, wherein, in the host server, the viewer group having the identical attitude is estimated by analogy on a basis of the reaction time-series data obtained from the plurality of information processing devices and the identical viewing environment is generated based on the temporal change of reaction of the viewer group having the identical attitude;
a receiver that receives the identical viewing environment data from the host server; and
a stereophonic sound technology using multi-channel speech separation, the stereophonic sound technology provides the first viewing environment to the first viewer based on the received identical viewing environment data and provides a second viewing environment that is different from the first viewing environment to a second viewer having an attitude towards the program that is different from the attitude of the first viewer towards the program.

2. The information processing device according to claim 1, wherein the viewing environment includes an environmental sound.

3. The information processing device according to claim 1, wherein
the program is a program in which a plurality of performers or a plurality of teams appears, and
the reaction information of the first viewer includes information indicating a cheering action toward a specific performer out of the plurality of performers or a specific team out of the plurality of teams.

4. The information processing device according to claim 1, wherein the reaction information of the first viewer includes at least one of a voice uttered by the first viewer, an external appearance of the first viewer, or a motion of the first viewer.

5. The information processing device according to claim 1, wherein
the reaction information is individually collected for each of a plurality of the viewers,
the reaction determiner individually determines an attitude of each of the plurality of viewers toward the program, and
the environment provider individually provides a viewing environment to each of the plurality of viewers.

6. The information processing device according to claim 1, wherein the data related to the identical viewing environment includes data of an environmental sound, the environmental sound being generated by combining voices of the viewer group having the identical attitude.

7. The information processing device according to claim 6, wherein the environmental sound includes the voices of the viewer group having the identical attitude and a voice that is added in accordance with the reaction information of the first viewer.

8. The information processing device according to claim 1,
wherein the receiver further receives metadata related to the program to be used for collecting the reaction information of the first viewer from the host server.

9. The information processing device according to claim 8, wherein the metadata includes instruction data that issues an instruction to cause an event of prompting the first viewer to react toward the program to occur.

10. The information processing device according to claim 9,
wherein the circuitry is further configured to cause an event of prompting the first viewer to react toward the program to occur on a basis of the metadata.

11. The information processing device according to claim 1, wherein the identical viewing environment data includes video data using a camera angle based on the temporal change of reaction of the viewer group having the identical attitude.

12. An information processing system comprising:
a plurality of information processing devices each coupled to a network, each of the plurality of information processing devices includes
circuitry configured to
determine, on a basis of reaction information of a viewer who views a program, an attitude of the viewer toward the program, and
provide the viewer with a viewing environment that is identical to a viewing environment provided to a viewer group having an attitude that is identical to the attitude of the viewer towards the program;
collect the reaction information of the viewer who views the program,
generate reaction time-series data that indicates a temporal change of a reaction of the viewer who views the program,
a transmitter that transmits the reaction time-series data for each viewer to the network, and a receiver that receives the identical viewing environment data from the network; and a host server coupled to the network, the host server includes a receiver that receives the reaction time-series data generated by the plurality of the information processing devices, circuitry configured to estimate by analogy the viewer group having the identical attitude on a basis of the reaction time-series data for each of a plurality of the viewers obtained from the plurality of information processing devices, and generate identical viewing environment data based on the temporal change of reaction of the viewer group having the identical attitude; and a transmitter that transmits the viewing environment data to the plurality of information processing devices, wherein at least one of the information processing devices includes stereophonic sound technology using multichannel speech separation. the stereophonic sound technology provides a first viewing environment to a first viewer based on the received identical viewing environment data and provides a second viewing environment that is different from the first viewing environment to a second viewer having an attitude towards the program that is different from the attitude of the first viewer towards the program.

13. The information processing system according to claim 12, wherein the transmitter of the host server further transmits, to each of the information processing devices, metadata related to the program to be used for collecting the reaction information of the viewer.

14. The information processing system according to claim 12, wherein the plurality of information processing devices is coupled to each other via a P2P network.

15. The information processing system according to claim 12, wherein the identical viewing environment data includes video using a camera angle based on the temporal change of reaction of the viewer group having the identical attitude.

* * * * *